United States Patent [19]
Bovio
[11] 4,123,653
[45] Oct. 31, 1978

[54] ARRANGEMENT FOR DETECTING THE ANGULAR POSITION OF A ROTATABLE PART

[75] Inventor: Michele Bovio, Banchette (Turin), Italy
[73] Assignee: Ing. C. Olivetti & C., S.p.A., Ivrea (Turin), Italy

[21] Appl. No.: 753,498
[22] Filed: Dec. 22, 1976
[30] Foreign Application Priority Data
Dec. 31, 1975 [IT] Italy .............................. 70232 A/75
[51] Int. Cl.[2] ............................................... G01D 5/34
[52] U.S. Cl. .......................... 250/231 SE; 250/237 G
[58] Field of Search .............. 250/231 SE; 250/237 G

[56] References Cited

U.S. PATENT DOCUMENTS

| | | | |
|---|---|---|---|
| 3,187,187 | 6/1965 | Wingate | 250/231 SE X |
| 3,693,024 | 9/1972 | Hulle et al. | 250/231 SE |
| 3,770,970 | 11/1973 | Trump | 250/231 SE |
| 3,770,971 | 11/1973 | Somerset | 250/231 SE |
| 3,995,156 | 11/1976 | Angersbach et al. | 250/231 SE X |

*Primary Examiner*—Palmer C. Demeo
*Attorney, Agent, or Firm*—Schuyler, Birch, Swindler, McKie & Beckett

[57] ABSTRACT

An arrangement for detecting the angular position for a rotatable part, for example, the printing head of an office machine comprises a shaft coupled to the rotatable part for rotating in synchronism therewith, a first rotatable cylinder arranged to rotate with the shaft and having disposed along a circumferential track a plurality of recognition apertures which are associated with predetermined discrete angular positions of the rotatable part. A first detecting unit is arranged to co-operate with the plurality of apertures to detect the predetermined discrete angular positions of the rotatable part. A second rotatable cylinder is rotatably mounted inside the first cylinder and is coupled to the shaft through speed reduction gears. On the second cylinder there is disposed at least one synchronizing element co-operating with a second detecting unit to detect complete revolutions of the rotatable part. The number of discrete angular positions of the rotatable part is equal to the number of the plurality of recognition apertures multiplied by the speed reduction ratio between the shaft and the second rotatable cylinder and divided by the number of synchronizing elements of the second cylinder.

5 Claims, 3 Drawing Figures

ARRANGEMENT FOR DETECTING THE ANGULAR POSITION OF A ROTATABLE PART

BACKGROUND OF THE INVENTION

1. Field of Invention

The present invention relates to an arrangement for detecting the angular position of a rotatable part, for example, a printing head or other part of an office machine.

2. Description of the Prior Art

An arrangement is known wherein detection of the angular position of the rotating part is effected by means of a disc rigidly connected to the rotatable part itself and having on a first circumferential track thereof as many cut-outs as there are angular positions in which the rotatable part can be positioned. These cut-outs co-operate with a first light-sensing unit which detects the passage thereof and generates a corresponding electric signal for each elementary angular movement of the rotatable part. In this arrangement, for phasing of the electric signals generated by the first light-sensitive unit and for generating a further electric signal at each complete revolution of the rotatable part, a further cut-out is provided on a second circumferential track of the disc or of a second disc keyed to the first. A second light-sensing unit co-operates with this further cut-out.

This arrangement has the disadvantage that if there are many angular positions to be detected, and therefore if the elementary angular movement is of a few degrees, there are also many cut-outs along the first cirumferential track of the disc and, therefore, since they must be spaced sufficiently from one another to give the light-sensing unit the means of detecting them individually, the diameter of the disc becomes very large and the arrangement becomes cumbersome.

SUMMARY OF THE INVENTION

The object of the present invention is to provide an arrangement which need be neither cumbersome nor costly.

According to the present invention, there is provided an arrangement for detecting the angular position of a rotatable part, comprising the rotatable part, a shaft coupled to the rotatable part to rotate in synchronism therewith, a first rotatable element arranged to rotate with the shaft and having disposed along a circumferential track a plurality of recognition elements which are associated with predetermined discrete angular positions of the rotatable part, a first detecting unit arranged to co-operate with the plurality of recognition elements to detect the said predetermined discrete angular positions, a second rotatable element coupled to the shaft through speed reduction means and on which there is disposed at least one synchronizing element co-operating with a second detecting unit to detect complete revolutions of the rotatable part, the number of discrete angular positions of the rotatable part being equal to the number of recognition elements of the said plurality multiplied by the speed reduction ratio between the shaft and the second rotatable element, and divided by the number of synchronizing elements.

Although the greatest benefit, in terms of a wider spacing of the recognition elements on the first rotatable element, is obtained when there is a single synchonrizing element on the second rotatable element, it is also possible to obtain a useful result with more than one synchronizing element, e.g. two synchronizing elements at intervals of 180° round the second rotatable element.

The number of recognition elements on the first rotatable element is conveniently, but not necessarily, an integral submultiple of the said number of discrete angular positions of the rotating part.

The nature of the recognition and sensing elements will depend upon the nature of the detecting units used to detect them, whether these units are electro-optical, inductive or of other form.

BRIEF DESCRIPTION OF THE DRAWING

The invention will be described in more detail, by way of example, with reference to the accompanying drawings, in which.

DESCRIPTION OF PREFERRED EMBODIMENT

Figure 1:
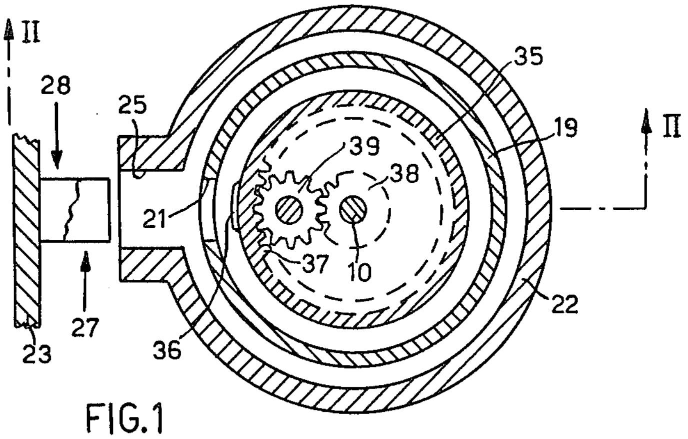
FIG. 1 is a plan view in section of an arrangement embodying the invention.
Figure 2:
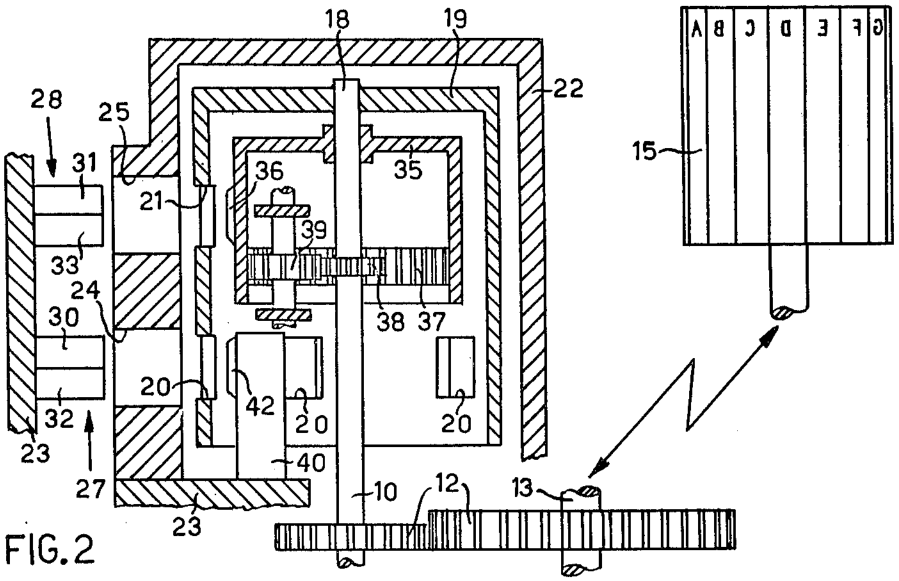
FIG. 2 is a section on the line II—II of FIG. 1.
Figure 3:
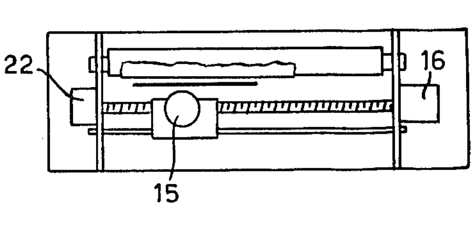
FIG. 3 is a plane view of an office machine which embodies an arrangement according to the present invention.

The arrangement embodying the invention comprises a shaft 10 connected via a pair of gears 12 to a rotating part 13 which is connected to a printing head 15 or to the element 16 which controls the shifting of the carriage of an office machine, both of which are of known type and shown here only diagrammatically in FIG. 2. The transmission ratio between the gears 12 is chosen on the basis of a principle which will be described later on. The shaft 10 has keyed to one end 18 thereof a hollow cylinder 19 which is open at the bottom. Around a first, lower, circumferential track of the cylinder 19 there is formed a plurality of windows or cutouts 20 which are spaced equally from one another on a second, upper, circumferential track of the cylinder 19 there is formed another window or cut-out 21 aligned with one of the windows 20.

The cylinder 19 is rotatable inside a casing 22 fixed to a base 23. On one side of the casing 22 there are formed two openings 24 and 25 which are aligned with one another and are disposed in axial correspondence with the windows 20 and 21, respectively. In front of the openings 24 and 25 and mounted on the base 23 two detecting units 27 and 28 are arranged. Each unit 27, 28 comprises an infra-red ray source 30, 31, respectively, and a phototransistor 32, 33, respectively, associated therewith. Each detecting unit 27 and 28 is of the type such that, when faced by a white surface, the rays emitted by the infra-red source are picked up by reflection by the phototransistor, creating in this way a flow of current in the phototransistor. On the other hand, if a black surface presents iself in front of the detecting unit, the rays emitted are absorbed and no longer reflected, so that the phototransistor does not cause current to flow.

Inside the cylinder 19 there is arranged a second hollow cylinder 35 which is mounted coaxially with respect to the shaft 10 and is rotatable with respect thereto. The cylinder 35 bears on its outer surface, in axial correspondence with the window 21, a plate 36 of white colour having dimensions substantially equal to those of the window 21 itself, and bears on its inner surface an internally toothed ring gear 37.

On the shaft 10, in axial correspondence with the internally toothed gear 37, there is keyed a gear 38 which is in mesh with an idle gear 39 which is in mesh in turn with the internally toothed gear 37. The transmission ratio between the gear 38 and the internally toothed gear 37 is chosen on the basis of a principle which will be described later on and, as will be seen, is equal to that between the shaft 10 and the rotating part 13, whereby the transmission ratio between the rotating part 13 and the cylinder 35 is unity. For simplicity the bearing for the gear 39 is not shown, nor are the means which locate the rotating cylinder 35 axially.

On the base 23 there is mounted a supporting element 40 to which is fixed a plate 42 of white colour disposed in axial correspondence with the opening 24 and having dimensions substantially equal to those of the windows 20.

The transmission ratio between the rotating part 13 and the shaft 10 is chosen taking account of the number of angular positions which must be detected and of the number of cut-outs 20 which it is desired to form in the cylinder 19. More particularly, the transmission ratio multiplied by the number of cut-outs 20 must be equal to the number of angular positions to be detected. For convenience, there is chosen first the number of cut-outs 20 to be formed on the lower circumferential track of the cylinder 19, which should be well spaced from one another and therefore rather limited in number, for example five. If, for example, there are forty discrete angular positions of the part 13 to be detected, that is corresponding to elementary angular movements of 9°, the transmission ratio between the part 13 and the shaft 10 is eight. In this way, for each revolution of the rotating part 13, the cylinder 19 performs eight revolutions and presents a window 20 in front of the opening 24 40 times. Moreover, the five windows 20 will be spaced from one another by 72° and a sufficient space can be obtained between one window and the next.

At each passage of a window 20 in front of the opening 24, the rays emitted by the source 30 are reflected by the fixed plate 42 and picked up by the phototransistor 32, which generates a corresponding electric signal.

As has already been described, the transmission ratio between the gear 38 and the gear 37 is equal to that between the shaft 10 and the rotating part 13. In fact, even if the shaft 10 rotates eight times faster than the rotating part 13, the cylinder 35 must be made to rotate at the same angular velocity as the rotating part 13, so that the plate 36 will present itself in front of the opening 25 only once in each revolution of the rotating part 13 itself, in order to cause the phototransistor 33 to generate a synchronizing signal.

In order to cause the rays of the units 27 and 28 to be reflected only by the plates 42 and 36, respectively, the outer surfaces of the cylinders 19 and 35 are coloured with opaque paint, which is preferably black.

It is obvious that the transmission ratio between the rotating part 13 and the shaft 10 and the number of cut-outs 20 in the cylinder 19 may be different from those previously given, provided that their product is still equal to the number of angular positions of the rotating part 13 to be detected.

What is claimed is:

1. An arrangement for detecting a plurality of angular positions of a rotatable part and a complete revolution thereof, said arrangement comprising:

a first rotatable element coupled to said rotatable part, through speed multiplication means, for rotating in synchronism therewith, said first rotatable element comprising, along a first circumferential track, a plurality of windows equally spaced therebetween and positioned to correspond to said angular positions, and, along a second circumferential track, a single window;

a first detecting unit cooperative with said plurality of windows for generating an output signal indicative of said angular positions, at the passage of each one of said plurality of windows in front of said unit;

a second rotatable element coupled to said first rotatable element through speed reduction means and having a single synchronizing element disposed aligned with said second circumferential track; and a second detecting unit cooperative with said single window and said single synchronizing element for generating another output signal indicative of said complete revolution when said single window and said single synchronizing element are aligned therewith.

2. An arrangement according to claim 1, wherein said first rotatable element comprises a first hollow cylinder fixed to a shaft, and wherein said second rotatable element comprises a second cylinder mounted rotatably coaxially with said shaft inside said first cylinder.

3. An arrangement according to claim 2, wherein said second cylinder is hollow and said speed reduction means comprise a first gear fixed to rotate with said shaft, an internally toothed ring gear fixed to the inside of said second cylinder, and an idle gear meshing with said first gear and with said ring gear.

4. An arrangement according to claim 1, wherein said speed reducing means has a transmission ratio equal to the number of angular positions to detect divided by number of said plurality of windows.

5. An arrangement according to claim 1, wherein the transmission ratio between said first rotatable element and said second rotatable element is equal to that between said first rotatable element and said rotatable part, whereby the transmission ratio between said rotatable part and said second rotatable element is equal to the unity.

* * * * *